(12) United States Patent
Deng (10) Patent No.: US 11,947,765 B2
(45) Date of Patent: Apr. 2, 2024

(54) TOUCH PANEL AND DISPLAY PANEL (71) Applicant: KunShan Go-Visionox Opto-Electronics Co., Ltd., Jiangsu (CN)

(72) Inventor: Yichao Deng, Kunshan (CN)

(73) Assignee: KunShan Go-Visionox Opto-Electronics Co., Ltd., Kunshan (CN)

(*) Notice: Subject to any disclaimer, the term of this patent is extended or adjusted under 35 U.S.C. 154(b) by 0 days.

(21) Appl. No.: 18/315,272

(22) Filed: May 10, 2023

(65) Prior Publication Data
US 2023/0273704 A1 Aug. 31, 2023

Related U.S. Application Data (63) Continuation of application No. PCT/CN2021/121017, filed on Sep. 27, 2021.

(30) Foreign Application Priority Data

Dec. 7, 2020 (CN) .......................... 202011431027.8

(51) Int. Cl.
G06F 3/044 (2006.01)
(52) U.S. Cl.
CPC .......... G06F 3/0446 (2019.05); G06F 3/0445 (2019.05)
(58) Field of Classification Search
None
See application file for complete search history.

(56) References Cited

U.S. PATENT DOCUMENTS

| 11,264,434 B2 * | 3/2022 | Jeong | G06F 3/04164 |
| 2014/0060909 A1 * | 3/2014 | Ullmann | H05K 3/00 174/262 |

(Continued)

FOREIGN PATENT DOCUMENTS

| CN | 103380411 A | 10/2013 |
| CN | 103534668 A | 1/2014 |

(Continued)

OTHER PUBLICATIONS

Jeffrey Lee, et al., "An Analysis of Electrode Patterns in Capacitive Touch Screen Panels," Journal of Display Technology, Dec. 31, 2014, vol. 10, No. 5, Optica Publishing Group, US; 5 total pages.

(Continued)

Primary Examiner — Patrick N Edouard
Assistant Examiner — Peijie Shen
(74) Attorney, Agent, or Firm — Rimon PC (57) ABSTRACT According to a touch panel and a display panel provided in embodiments of the present application, a first connecting structure for connecting adjacent two first electrode units and a second connecting structure for connecting adjacent two second electrode units are improved. In this way, graphic design is performed on the second connecting structure and a wired manner of the first connecting structure is designed, so that an area of an intersection between the first connecting structure and the second connecting structure can be reduced, thereby reducing parasitic capacitance between the first connecting structure and the second connecting structure, and further improving or eliminating an impact of a bridging point of a touch electrode on touch linearity of a touch panel, to ensure better stability of the touch panel in use.

18 Claims, 9 Drawing Sheets

(56) References Cited

U.S. PATENT DOCUMENTS

| | | | | |
|---|---|---|---|---|
| 2014/0332262 A1* | 11/2014 | Yoshiki | ............... | G06F 3/0445 174/264 |
| 2015/0083568 A1 | 3/2015 | Park et al. | | |
| 2016/0195983 A1* | 7/2016 | Miyake | ............... | G06F 3/04164 345/174 |
| 2018/0190723 A1* | 7/2018 | Han | ............... | G06F 3/0412 |
| 2019/0204964 A1 | 7/2019 | Wang et al. | | |
| 2020/0091247 A1* | 3/2020 | Lee | ............... | G06F 3/0443 |
| 2021/0357077 A1* | 11/2021 | Feng | ............... | G06F 3/0412 |

FOREIGN PATENT DOCUMENTS

| | | | |
|---|---|---|---|
| CN | 103797449 A | 5/2014 |
| CN | 203930718 U | 11/2014 |
| CN | 105009044 A | 10/2015 |
| CN | 105183203 A | 12/2015 |
| CN | 205015856 U | 2/2016 |
| CN | 107665058 A | 2/2018 |
| CN | 108281460 A | 7/2018 |
| CN | 207780739 U | 8/2018 |
| CN | 108693994 A | 10/2018 |
| CN | 108958552 A | 12/2018 |
| CN | 109375826 A | 2/2019 |
| CN | 109426389 A | 3/2019 |
| CN | 210534754 U | 5/2020 |
| CN | 111290655 A | 6/2020 |
| CN | 112578934 A | 3/2021 |
| JP | 2015064756 A | 4/2015 |
| TW | 201546695 A | 12/2015 |

OTHER PUBLICATIONS

Jinfang Zhang, et al., "A High Precision Drive and Detection Method for Projected Capacitive Touch Panel," Journal of University of Electronic Science and Technology of China, Sep. 30, 2016, vol. 45, No. 5, University of Electronic Science and Technology of China, Sichuan, China; 4 total pages, including English Abstract.
Chinese First Office Action for Chinese Application No. 202011431027. 8, dated Apr. 18, 2022; 44 total pages, including English translation.
Chinese Notification to Grant Patent Right for Invention for Chinese Application No. 202011431027.8, dated Oct. 21, 2022; 4 total pages, including English translation.
PCT International Search Report for International Application No. PCT/CN2021/121017, dated Dec. 30, 2021; 5 total pages, including English translation.
PCT Written Opinion for International Application No. PCT/CN2021/121017, dated Dec. 30, 2021; 7 total pages, Including English translation.

\* cited by examiner

TOUCH PANEL AND DISPLAY PANEL

CROSS-REFERENCE TO RELATED APPLICATIONS

This application is a continuation of International Application No. PCT/CN2021/121017, filed on Sep. 27, 2021, which claims priority to Chinese Patent Application No. 202011431027.8, filed on Dec. 7, 2020. The disclosures of the aforementioned applications are hereby incorporated by reference in their entireties.

TECHNICAL FIELD

The present application relates to the field of touch technologies, and more specifically, to a touch panel and a display panel.

BACKGROUND

Users have increasingly high touch requirements for flexible touch products, which promotes a more refined method to be used in production of a touch panel of a flexible product. In some use scenarios, a touch panel usually needs to have better stability in use. However, in-use stability of a common touch panel may be affected by a bridge point of a touch electrode.

SUMMARY

In view of this, the present application provides a touch panel and a display panel, in which a second connecting structure for connecting adjacent two second electrode units is improved, and the second connecting structure is designed to include a plurality of connecting grids and a graphics unit adjacent to one of the plurality of connecting grids. In such a design, graphic design is performed on the second connecting structure, so that an area of an intersection between a first connecting structure and the second connecting structure can be reduced, thereby reducing parasitic capacitance between the first connecting structure and the second connecting structure, and further improving or eliminating an impact of a bridging point of a touch electrode on touch linearity of a touch panel, to ensure better stability of the touch panel in use.

A first aspect of an embodiment of the present application provides a touch panel, including: a plurality of first electrode units distributed along a first direction; a plurality of second electrode units distributed along a second direction; a first connecting structure, adjacent two of the plurality of first electrode units being connected through the first connecting structure; a second connecting structure, adjacent two of the plurality of second electrode units being connected through the second connecting structure, the second connecting structure comprising a plurality of connecting grids and a graphics unit adjacent to the connecting grids, and an insulating layer disposed between the first connecting structure and the second connecting structure; wherein an orthographic projection of the first connecting structure on the second connecting structure intersects with the graphics unit to make the graphics unit have a plurality of graphics grids identical to the connecting grids.

A second aspect of the embodiment of the present application provides a display panel including a pixel unit for emitting light, and a touch panel located on one side of the pixel unit, as described in the first aspect. The pixel unit includes at least three sub-pixels of different colors. An orthographic projection of at least one pixel unit on the touch panel is located within an outer contour of the connecting grid.

A third aspect of the embodiment of the present application provides a touch panel, including a plurality of second electrode units distributed along a second direction and a second connecting structure. Adjacent two of the plurality of second electrode units are connected through the second connecting structure, and the second connecting structure includes a plurality of connecting grids and a graphics unit adjacent to the connecting grids. The connecting grid includes a plurality of subgrids connected to each other. The graphics unit includes a plurality of graphics subunits connected to each other, and an area of the smallest graphics subunit in the plurality of graphics subunits is greater than or equal to twice an area of the smallest subgrid in the plurality of subgrids.

A fourth aspect of the embodiment of the present application provides a touch panel, including a plurality of first electrode units distributed along a first direction, a plurality of second electrode units distributed along a second direction, a first connecting structure and a second connecting structure. Adjacent two of the plurality of first electrode units are connected through the first connecting structure. The first connecting structure includes at least two bridge structures, the two bridge structures each includes two bridging lines, and the two bridge structures intersect with each other to form an overlapping region. Adjacent two of the plurality of second electrode units are connected through the second connecting structure. The second connecting structure includes a plurality of connecting grids, and one of the plurality of connecting grids includes a plurality of subgrids connected to each other. An area of an orthographic projection of the overlapping region on a plane where the second connecting structure is located is greater than or equal to an area of an orthographic projection of one subgrid on the plane where the second connecting structure is located.

In view of the above, compared with the conventional technology, in the touch panel and the display panel provided in the embodiments of the present application, a first connecting structure for connecting adjacent two of the plurality of first electrode units and a second connecting structure for connecting adjacent two second electrode units are improved. The second connecting structure is designed to include a plurality of connecting grids and a graphics unit adjacent to one of the plurality of connecting grids, the first connecting structure is designed to be that an orthographic projection of the first connecting structure on the second connecting structure intersects with the graphics unit to make the graphics unit have a plurality of graphics grids identical to one of the plurality of connecting grids. In this way, graphic design is performed on the second connecting structure and a wired manner of the first connecting structure is designed, so that an area of an intersection between the first connecting structure and the second connecting structure can be reduced, thereby reducing parasitic capacitance between the first connecting structure and the second connecting structure, and further improving or eliminating an impact of a bridging point of a touch electrode on touch linearity of a touch panel, to ensure better stability of the touch panel in use.

DETAILED DESCRIPTIONS OF THE EMBODIMENTS

To make objectives, technical solutions and advantages of the present application clearer, a further detailed description of the present application is given below in combination with accompanying drawings and embodiments. It should be understood that the specific embodiments described herein are only used to explain the present application, and are not intended to limit the present application.

Figure 1:
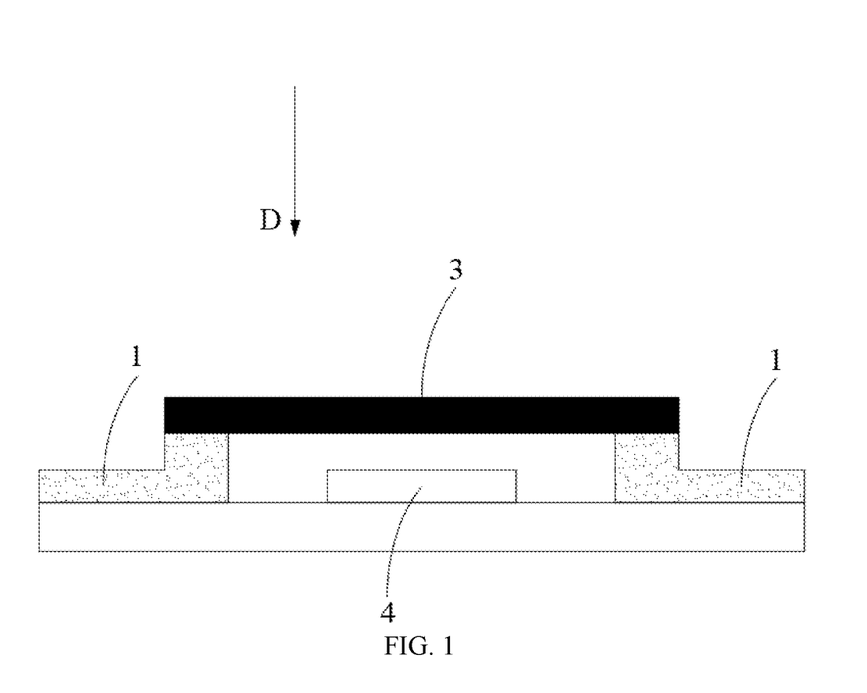
FIG. 1 is a schematic diagram of a bridge structure of a common touch panel.

The inventor analyzed bridging points between touch electrodes of a common touch panel and found that parasitic capacitance generated at a bridging point is one of factors affecting touch linearity of the touch panel. As shown in FIG. 1, when a first connecting structure 3 goes across a second connecting structure 4, mutual capacitance is generated at a part where they intersect in a direction D, and the mutual capacitance may be understood as parasitic capacitance. Due to presence of the parasitic capacitance, linearity of a touch panel may drop. To improve the problem, an embodiment of the present application provides a touch panel and a display panel, and graphic design is performed on the second connecting structure 4 and a wired manner of the first connecting structure 3 is designed, so that an area of an intersection between the first connecting structure 3 and the second connecting structure 4 may be reduced, thereby reducing parasitic capacitance between the first connecting structure 3 and the second connecting structure 4, and further improving or eliminating an impact of a bridging point of a touch electrode on touch linearity of a touch panel, to ensure better stability of the touch panel in use.

Figure 2:
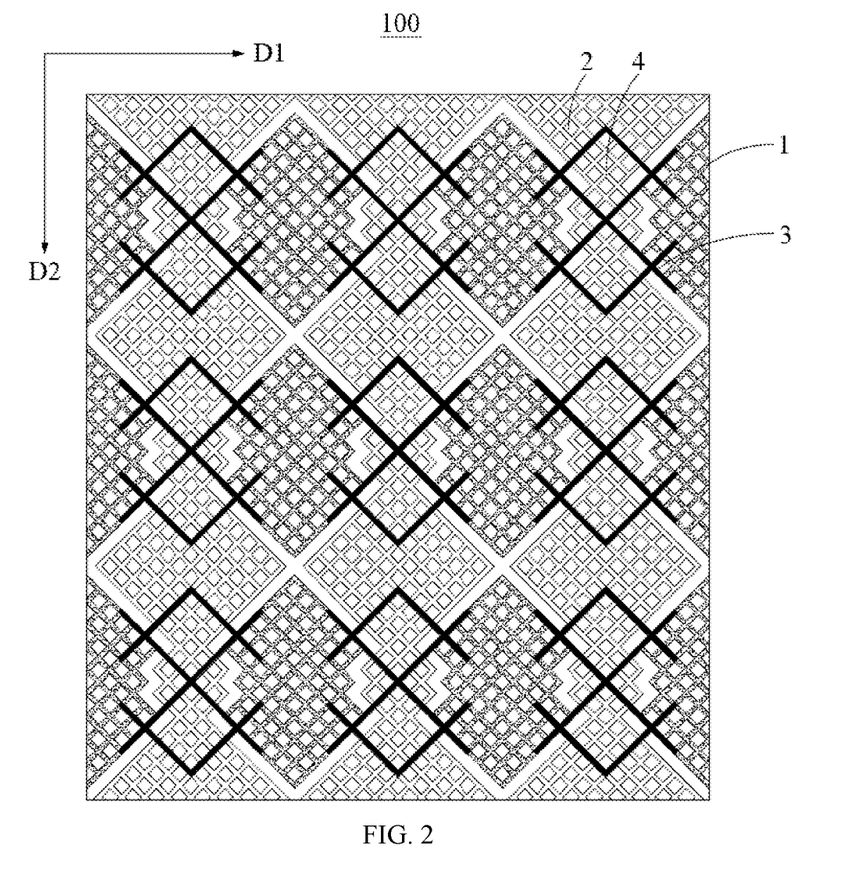
FIG. 2 is a schematic plan view of a touch panel according to an embodiment of the present application.
Figure 3:
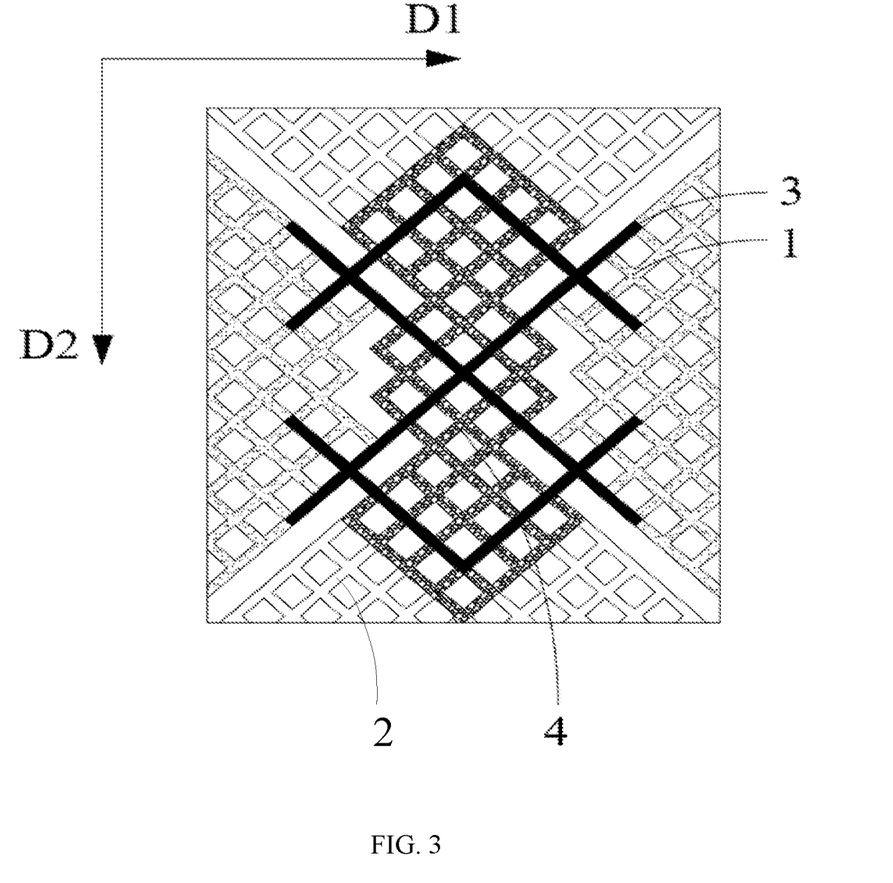
FIG. 3 is a partial enlarged view of one of touch sensing units of a touch panel according to an embodiment of the present application.

Referring to FIG. 2 and FIG. 3, a touch panel 100 provided in an embodiment of the present application may include a plurality of first electrode units 1 distributed along a first direction D1, a plurality of second electrode units 2 distributed along a second direction D2, a first connecting structure 3, and a second connecting structure 4, an insulating layer. The first direction D1 and the second direction D2 may intersect, which is not limited thereto. Adjacent two of the plurality of first electrode units 1 are connected through the first connecting structure 3, adjacent two of the plurality of second electrode units 2 are connected through the second connecting structure 4, and the insulating layer (not shown in the figure) is disposed between the first connecting structure 3 and the second connecting structure 4.

Figure 4:
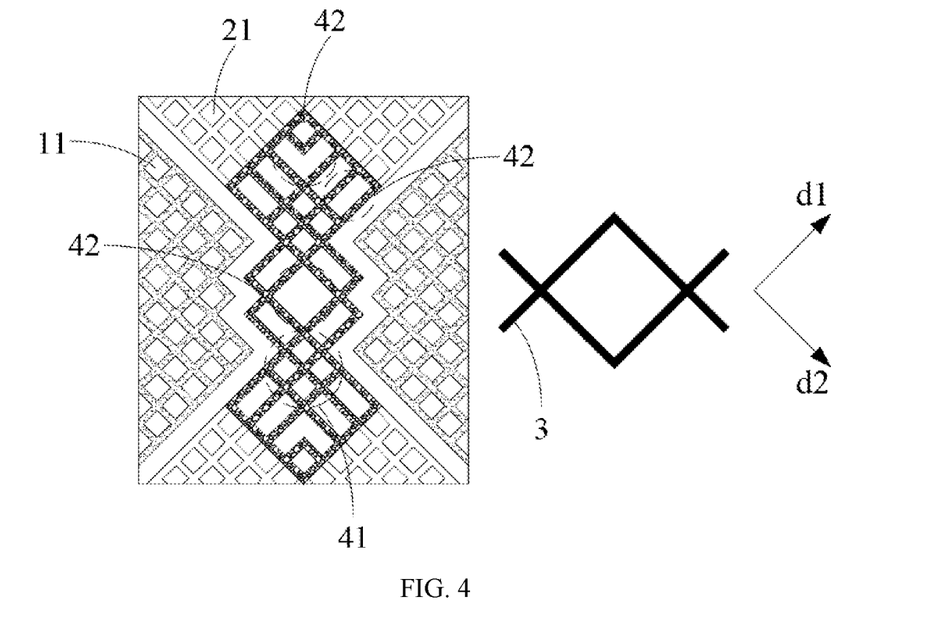
FIG. 4 is a schematic diagram in which a first connecting structure is moved out from the touch sensing unit shown in FIG. 3.

Further, referring to FIG. 4, the second connecting structure 4 may include a plurality of connecting grids 41 and a graphics unit adjacent to at least one of the plurality of connecting grids 41. An orthographic projection of the first connecting structure 3 on the second connecting structure 4 intersects with the graphics unit to make the graphics unit have a plurality of graphics grids identical to the connecting grids 41. The first connecting structure 3 may go across the second connecting structure 4 to implement connection between adjacent two of the plurality of first electrode units 1, and the first connecting structure 3 may be a non-linear structure. In the embodiment, the graphics unit includes a plurality of graphics subunits 42, and the graphics subunits 42 may be in a shape of a rectangle or heart-shaped, or in another shape, which is not limited herein.

It may be understood that, in FIG. 4, graphic design is performed on the second connecting structure 4 and a wired manner of the first connecting structure 3 is designed, so that an area of an intersection between the first connecting structure 3 and the second connecting structure 4 can be reduced, thereby reducing parasitic capacitance between the first connecting structure 3 and the second connecting structure 4, and further improving or eliminating an impact of a bridging point of a touch electrode on touch linearity of the touch panel 100, to ensure better stability of the touch panel 100 in use.

Figure 5:
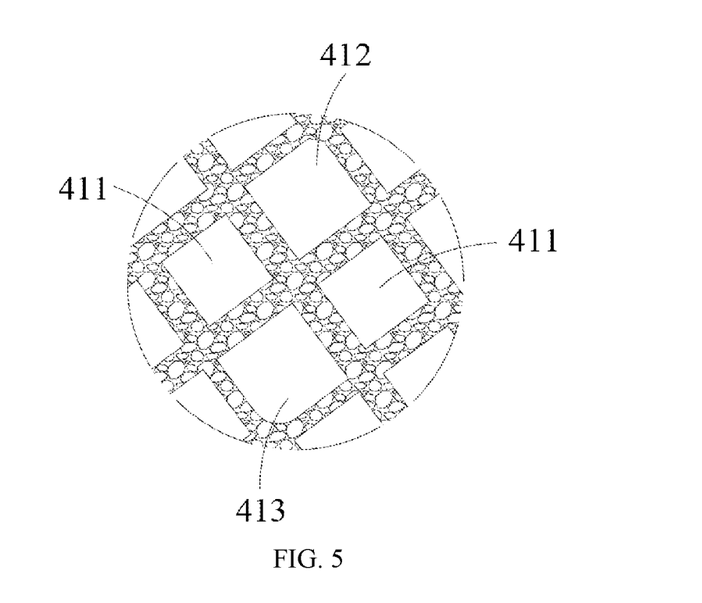
FIG. 5 is an enlarged view of the circled portion 41 shown in FIG. 4.

In some examples, to minimize an overlapping area of the second connecting structure 4 and an orthographic projection of the first connecting structure 3 on the second connecting structure 4, referring to FIG. 5, the connecting grid 41 may include a plurality of subgrids connected to each other, such as a first subgrid 411, a second subgrid 412, and a third subgrid 413 that are shown in the figure, and a plurality of subgrids may share one vertex. Two first subgrids 411 connected to each other along a third direction each are connected to the second subgrid 412 and the third subgrid 413 connected to each other along a fourth direction. In the embodiment, the third direction and the first direction D1 may be the same or different, and the fourth direction and the second direction D2 may be the same or different. The first subgrid 411 may be a regular polygonal grid, and the second subgrid 412 and the third subgrid 413 may be a regular or irregular grid.

Still referring to FIG. 5, an area of an orthographic projection of the first subgrid 411 on the insulating layer is less than an area of an orthographic projection of the second subgrid 412 on the insulating layer, and the area of the orthographic projection of the first subgrid 411 on the insulating layer is less than an area of an orthographic projection of the third subgrid 413 on the insulating layer. In some possible examples, the area of the orthographic projection of the second subgrid 412 on the insulating layer may be larger than the area of the orthographic projection of the third subgrid 413 on the insulating layer. In some other possible examples, the area of the orthographic projection of the second subgrid 412 on the insulating layer may alternatively be equal to the area of the orthographic projection of the third subgrid 413 on the insulating layer. In addition, the area of the orthographic projection of the second subgrid 412 on the insulating layer may alternatively be less than the area of the orthographic projection of the third subgrid 413 on the insulating layer, which is not limited herein.

An area of an orthographic projection of the graphics subunit 42 on the insulating layer is greater than or equal to twice the area of the orthographic projection of the first subgrid 411 on the insulating layer. For example, when the graphics subunit 42 is a rectangle, the area of the orthographic projection of the graphics subunit 42 on the insulating layer may be twice the area of the orthographic projection of the first subgrid 411 on the insulating layer. For another example, when the graphics subunit 42 is heart-shaped, the area of the orthographic projection of the graphics subunit 42 on the insulating layer may be three times the area of the orthographic projection of the first subgrid 411 on the insulating layer. In the embodiment, the graphics unit may be formed by performing a hollowed-out design on a part of metal wires of the second connecting structure 4. The part of metal wires of the second connecting structure 4 obtained after the hollowed-out design is performed overlaps a projection of the first connecting structure 3 on the second connecting structure 4. In such a design, irregular design is performed on the graphics unit, so that an overlapping area of the second connecting structure 4 and an orthographic projection of the first connecting structure 3 on the second connecting structure 4 can be further reduced, thereby reducing parasitic capacitance between the first connecting structure 3 and the second connecting structure 4, to ensure touch linearity of the touch panel 100.

In some examples, still referring to FIG. 4, the first electrode unit 1 may include a plurality of first grids 11, and the plurality of first grids 11 are formed by a plurality of intersecting first metal wires. The second electrode unit 2 includes a plurality of second grids 21, and the plurality of second grids 21 and the plurality of connecting grids 41 are formed by a plurality of intersecting second metal wires. Further, the second electrode unit 2 includes a plurality of graphics grids identical to the connecting grids 41 in the second connecting structure 4, and the graphics unit may include a plurality of third grids formed by the plurality of intersecting second metal wires. In some examples, the third grid may be a closed grid or an unclosed grid, which is not limited herein. In this way, grid design is performed on the first electrode unit 1 and the second electrode unit 2, and grid design is also performed on the first connecting structure 3 and the second connecting structure 4, so that the entire touch panel 100 can be thinner and lighter, and parasitic capacitance generated at bridge points of different electrode units of the touch panel 100 is also reduced.

In some examples, the first connecting structure 3 may include a first bridge structure 31 and a second bridge structure 32, the first bridge structure 31 and the second bridge structure 32 each includes at least one bridging line, and the first bridge structure 31 and the second bridge structure 32 are separated from each other or connected to each other.

In some examples, the first bridge structure 31 and the second bridge structure 32 may be symmetrical to each other along the second direction D2. In some examples, referring to FIG. 6, a mutual connection between the first bridge structure 31 and the second bridge structure 32 may be that: the first bridge structure 31 and the second bridge structure 32 are in point contact with each other. Further, the first bridge structure 31 includes a first bridging line 311 and a second bridging line 312, and the second bridge structure 32 may include a third bridging line 321 and a fourth bridging line 322. The first bridging line 311 and the second bridging line 312 each is a polyline and intersects with each other to form at least one polygon S1. The third bridging line 321 and the fourth bridging line 322 each is a polyline and intersects with each other to form at least one polygon S2. An area of an orthographic projection of the polygon S1 and the polygon S2 on a plane where the second connecting structure 4 is located is greater than or equal to an area of an orthographic projection of at least one connecting grid 41 on the plane where the second connecting structure 4 is located.

Figure 6:
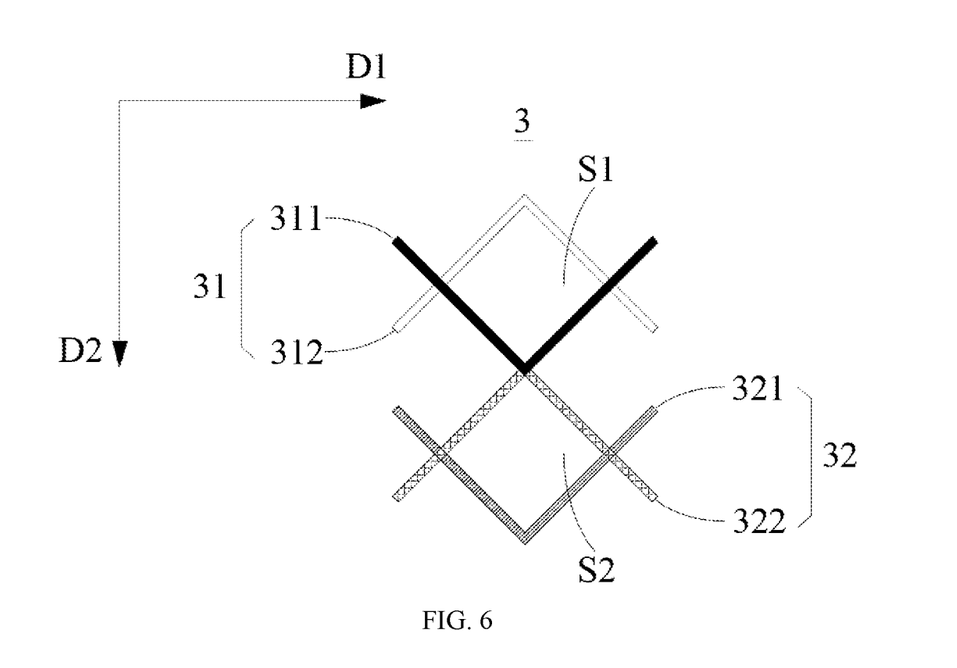
FIG. 6 is a schematic diagram of a first structure of a first connecting structure of a touch panel according to an embodiment of the present application.

Still referring to FIG. 6, along the second direction D2, the polygon S1 and the polygon S2 may have a same vertex. For example, a vertex of the polygon S1 of the first bridge structure 31 is shared with a vertex of the polygon S2 of the second bridge structure 32 that is opposite to the vertex of the polygon S1 of the first bridge structure 31. Along the first direction D1, the first bridging line 311 and the second bridging line 312 are in mirror symmetry with each other, and the third bridging line 321 and the fourth bridging line 322 are in mirror symmetry with each other.

Figure 7:
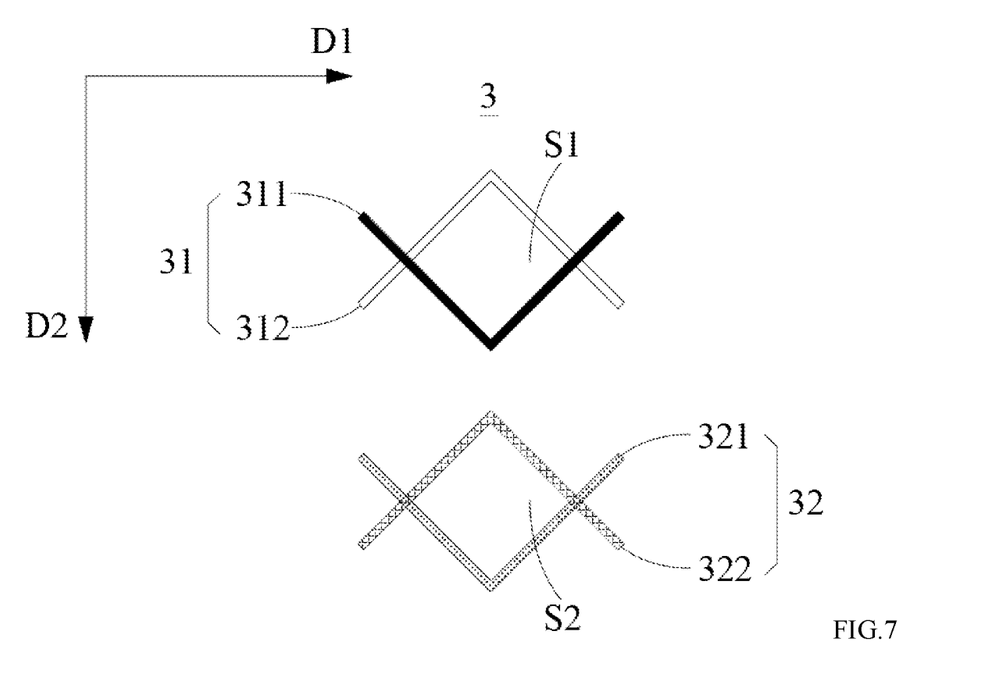
FIG. 7 is a schematic diagram of a second structure of a first connecting structure of a touch panel according to an embodiment of the present application.

In some examples, referring to FIG. 7, along the second direction D2, the first bridge structure 31 and the second bridge structure 32 are separated from each other. A distance exists between the polygon S1 and the polygon S2, and the polygon S1 and the polygon S2 have no common vertex. For example, a vertex of the polygon S1 of the first bridge structure 31 and a vertex of the polygon S2 of the second bridge structure 32 that is opposite to the vertex of the polygon S1 of the first bridge structure 31 having a distance therebetween.

Figure 8:
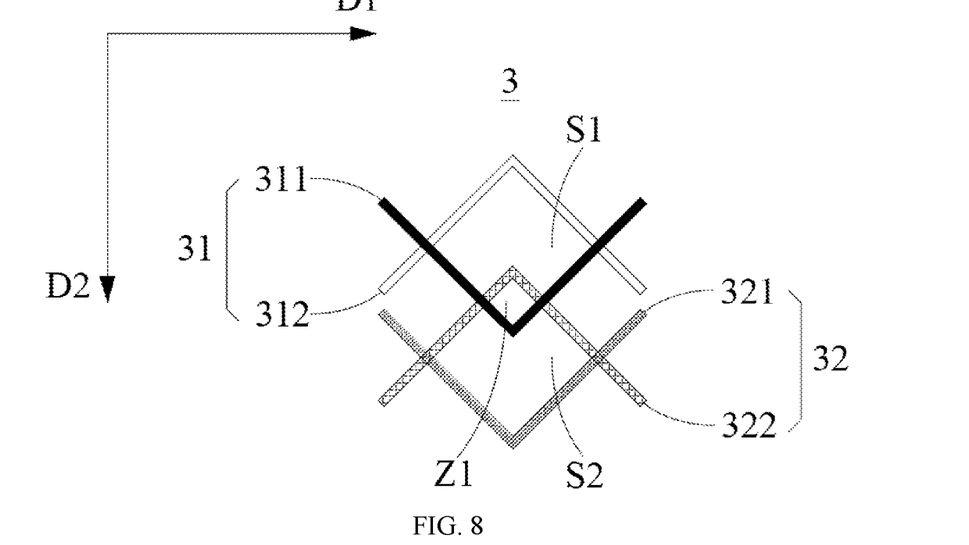
FIG. 8 is a schematic diagram of a third structure of a first connecting structure of a touch panel according to an embodiment of the present application.

In some examples, referring to FIG. 8 and FIG. 4, a form of mutual connection between the first bridge structure 31 and the second bridge structure 32 may be that: the first bridge structure 31 and the second bridge structure 32 intersect with each other. The first bridge structure 31 and the second bridge structure 32 intersect with each other to form an overlapping region Z1, and an area of an orthographic projection of the overlapping region Z1 on a plane where the second connecting structure 4 is located is greater than or equal to an area of an orthographic projection of one first subgrid 411 on the plane where the second connecting structure 4 is located.

Further, the first bridge structure 31 and the second bridge structure 32 each includes two bridging lines, and the two bridging lines intersect with each other to form a polygon S1 corresponding to the first bridge structure 31 and a polygon S2 corresponding to the second bridge structure 32. An area of an orthographic projection of the polygon S1 on a plane where the second connecting structure 4 is located is greater than or equal to an area of an orthographic projection of at least one connecting grid 41 on the plane where the second connecting structure 4 is located. An area of an orthographic projection of the polygon S2 on the plane where the second connecting structure 4 is located is greater than or equal to the area of the orthographic projection of the at least one connecting grid 41 on the plane where the second connecting structure 4 is located. Along the second direction D2, one of vertices of the polygon S1 of the first bridge structure 31 is located within the polygon S2 formed by the second bridge structure 32, and a vertex of the polygon S2 of the second bridge structure 32 opposite to the vertex of the polygon S1 of the first bridge structure 31 is located within the polygon S1 formed by the first bridge structure 31 to form the overlapping region Z1.

It may be understood that FIG. 6, FIG. 7, and FIG. 8 respectively show three design methods for the first bridge structure 31 and the second bridge structure 32. In an actual implementation process, any design method may be selected according to actual needs for design, which is not limited herein. In the design illustrated in FIG. 6, FIG. 7, or FIG. 8, bridging lines corresponding to each of the first bridge structure 31 and the second bridge structure 32 are polylines. In some other possible embodiments, the polyline-like bridging lines may be replaced.

Figure 9:
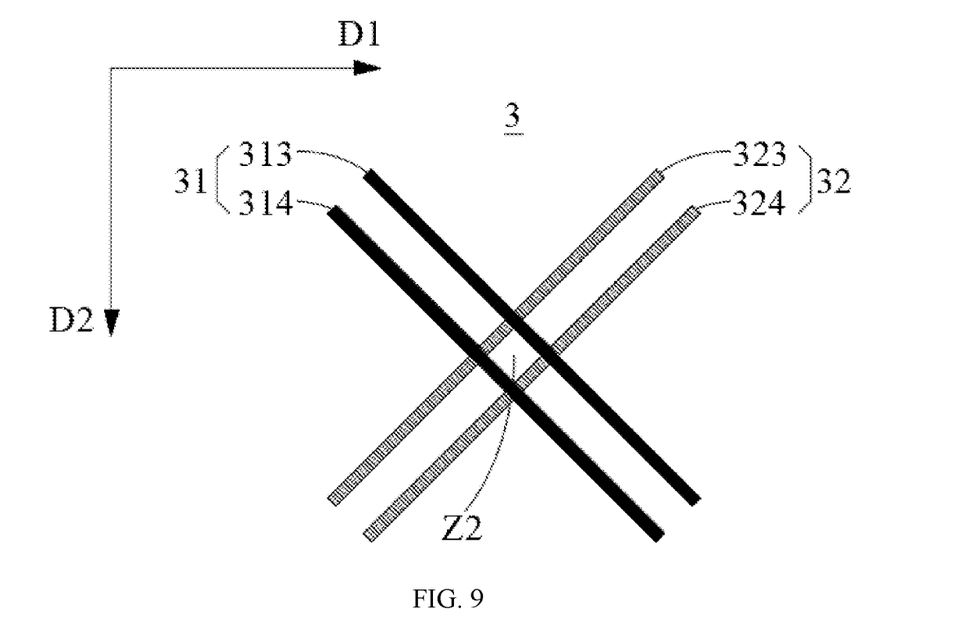
FIG. 9 is a schematic diagram of a fourth structure of a first connecting structure of a touch panel according to an embodiment of the present application.

In some examples, the first bridge structure 31 and the second bridge structure 32 may be designed according to the method shown in FIG. 9. For example, the first bridge structure 31 may include a fifth bridging line 313 and a sixth bridging line 314 parallel to each other, and the second bridge structure 32 may include a seventh bridging line 323 and an eighth bridging line 324 parallel to each other. The first connecting structure 3 may include an overlapping region Z2 formed by the fifth bridging line 313 and the sixth bridging line 314 intersecting with the seventh bridging line 323 and the eighth bridging line 324, and may further include two extension lines connecting to vertices of the overlapping region Z2. The extension line may be a part of the fifth bridging line 313, the sixth bridging line 314, the seventh bridging line 323, or the eighth bridging line 324.

In some examples, still referring to FIG. 9, an orthographic projection of the overlapping region Z2 on the second connecting structure 4 is overlapped with one of the graphics subunits 42. Preferably, the orthographic projection of the overlapping region Z2 on the second connecting structure 4 is located within one of the graphics subunits 42. For example, an area of an orthographic projection of the overlapping region Z2 on a plane where the second connecting structure 4 is located is greater than or equal to the area of the orthographic projection of one first subgrid 411 on the plane where the second connecting structure 4 is located. When the graphics subunit 42 is greater than or equal to the overlapping region Z2, the orthographic projection of the overlapping region Z2 on the second connecting structure 4 may overlap the graphics subunit 42. Further, an orthographic projection of the extension lines on the second connecting structure 4 and the graphics subunit 42 may intersect.

It may be understood that, according to the design for the first bridge structure 31 and the second bridge structure 32 in FIG. 6, FIG. 7, FIG. 8 and FIG. 9, parasitic capacitance between the first bridge structure 31 and the second bridge structure 32 can be reduced, and the design for the first bridge structure 31 can weaken and release stress generated when the touch panel 100 is bent, thereby preventing the first bridge structure 31 from breaking when the touch panel 100 is bent. In this way, structural stability and stress resistance of the touch panel 100 during use may be ensured, thereby improving in-use stability of the touch panel 100.

Figure 10:
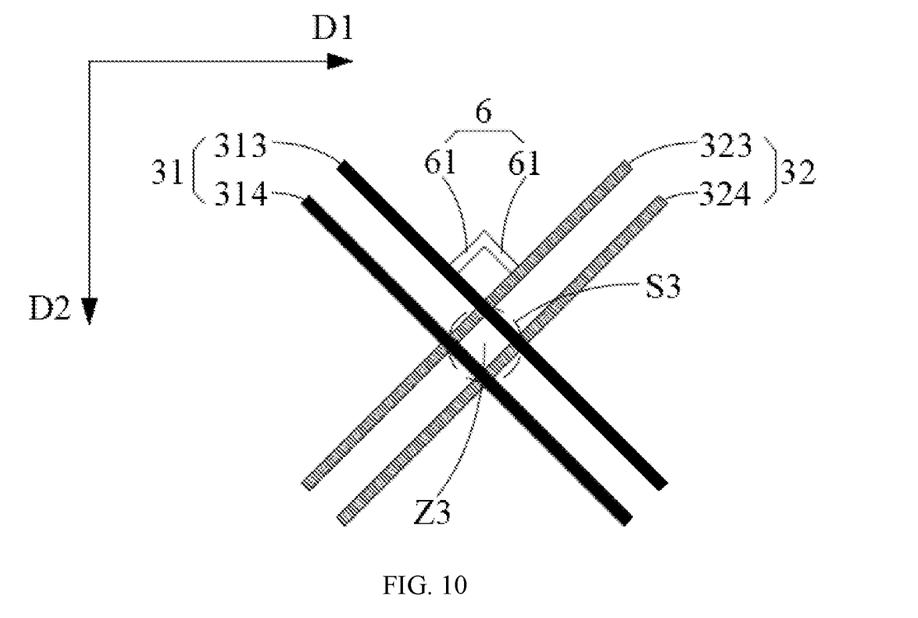
FIG. 10 is a schematic diagram of a fifth structure of a first connecting structure of a touch panel according to an embodiment of the present application.

In some examples, to further enhance the structural stability and stress resistance of the touch panel 100 during use, referring to FIG. 10, at least one reinforcing structure 6 may be further included. The reinforcing structure 6 includes two reinforcing metal wires 61, ends of the two reinforcing metal wires 61 is connected to each other, and the other ends of the two reinforcing metal wires 61 respectively intersects with two extension lines where one vertex of a polygon S3 is located. The reinforcing structure 6 and a vertex of the overlapping region Z3 form a reinforcing grid. In the embodiment, the overlapping region Z3 is a region surrounded by the polygon S3, that is, the overlapping region Z3 may be an enclosed region formed by the fifth bridging line 313, the sixth bridging line 314, the seventh bridging line 323, and the eighth bridging line 324 intersecting with each other.

In such a design, a reinforcing structure 6 is additionally disposed, so that stress resistance of the first connecting structure 3 can be improved, thereby further enhancing the structural stability and stress resistance of the touch panel 100 during use. In an actual implementation, the reinforcement grid may have the same shape as the overlapping region Z3, and the reinforcement grid and overlapping region Z3 share one vertice. For example, a quantity of reinforcing structures 6 may be in a one-to-one correspondence with that of reinforcement grids, and the quantity of reinforcing structures 6 may be one, two, three, or four, which is not limited herein. In this way, a plurality of reinforcing structures 6 may form a plurality of different reinforcing grids, and the different reinforcing grids may be distributed in the direction D1 or the second direction D2.

It may be understood that, the reinforcing structure 6 may be disposed accordingly on the first connecting structure 3 in FIG. 6, FIG. 7, and FIG. 8 as well. For example, the reinforcing structure 6 may be disposed at at least one intersection of the first bridging line 311 and the second bridging line 312, or may be disposed at at least one intersection of the third bridging line 321 and the fourth bridging line 322. The reinforcing structure 6 may also be disposed at an inflection point of the first bridging line 311, at an inflection point of the second bridging line 312, at an inflection point of the third bridging line 321 and/or at an inflection point of the fourth bridging line 322, which is not limited herein.

In some examples, bridging lines of the first connecting structure 3 each may be parallel to a first metal wire. As shown in FIG. 4, wiring directions of the first metal wires may include a first wiring direction d1 and a second wiring direction d2 that intersect with each other. The bridging lines of the first connecting structure 3 each being parallel to a first metal wire may be understood as that some of the bridging lines of the first connecting structure 3 are parallel to the first wiring direction d1, and others are parallel to the second wiring direction d2. In such a design, an area of intersection between the second connecting structure 4 and the bridging lines of the first connecting structure 3 can be minimized, thereby reducing parasitic capacitance between the second connecting structure 4 and the first connecting structure 3.

Referring to FIG. 10, when the reinforcing structure 6 is additionally disposed on the first connecting structure 3, an orthographic projection, on the second connecting structure 4, of an intersection shared by the bridging lines of the first connecting structure 3 does not overlap an intersection of the connecting grids 41 of the second connecting structure 4. An orthographic projection, on the second connecting structure 4, of an intersection formed between the reinforcing structure 6 and the bridging lines of the first connecting structure 3 does not overlap an intersection of the connecting grids 41 of the second connecting structure 4.

In an actual implementation process, the polygon described above may be in a shape of a triangle or a quadrilateral, and a quantity of sides of the overlapping region may be the same as a quantity of sides of the polygon, which is not limited herein.

Figure 11:
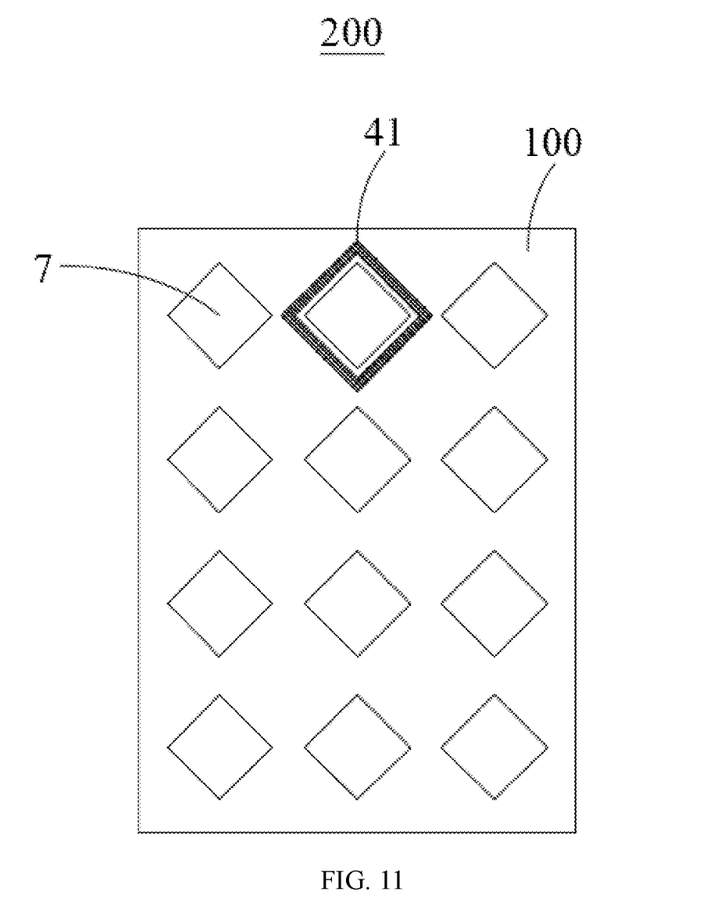
FIG. 11 is a schematic structural diagram of a display panel according to an embodiment of the present application.

On the basis of the above, an embodiment of the present application further provides a display panel 200. As shown in FIG. 11, the display panel 200 may include a pixel unit 7 for emitting light, and the pixel unit 7 may include at least three sub-pixels of different colors. The display panel 200 may further include the touch panel 100 described above located on one side of the pixel unit 7. An orthographic projection of at least one pixel unit 7 on the touch panel 100 is located within an outer contour of the connecting grid 41, or an orthographic projection of at least one pixel unit 7 on the touch panel 100 is located within the connecting grid 41. Further, the connecting grid 41 may include a plurality of adjacently arranged subgrids, and orthographic projections, on the touch panel 100, of sub-pixels of the pixel unit 7 with the orthographic projection located within the connecting grid 41 are located within outer contours of the subgrids, respectively.

Figure 12:
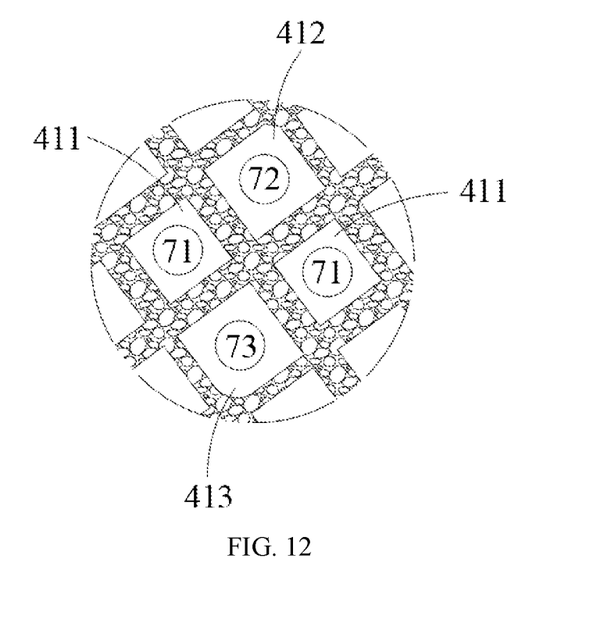
FIG. 12 is a schematic diagram of a relative position of a pixel unit to a connecting grid shown in FIG. 11.

In some examples, referring to FIG. 12, each pixel unit 7 may include two green sub-pixels 71, one red sub-pixel 72, and one blue sub-pixel 73. Orthographic projections of the two green sub-pixels 71 of at least one pixel unit 7 on the touch panel 100 are respectively located within inner contours of the first subgrids 411, an orthographic projection of the red sub-pixel 72 on the touch panel 100 is located within an inner contour of the second subgrid 412, and an orthographic projection of the blue sub-pixel 73 on the touch panel 100 is located within an inner contour of the third subgrid 413. It may be understood that, in an actual implementation, an arrangement manner of sub-pixels may not be limited to the foregoing manner.

Based on the same concept described above, a touch panel is further provided, including a plurality of second electrode units distributed along a second direction. Adjacent two second electrode units are connected through a second connecting structure, and the second connecting structure includes a plurality of connecting grids and a graphics unit adjacent to the connecting grids. The graphics unit includes a plurality of graphics subunits, the connecting grid includes a plurality of subgrids connected to each other, and an area of the smallest graphics subunit in the plurality of graphics subunits is greater than or equal to twice an area of the smallest subgrid in the plurality of subgrids. In such a design, graphic design is performed on the second connecting structure, so that hollowed-out processing is partially performed on the second connecting structure, thereby reducing an area of an intersection between the second connecting structure and a first connecting structure. In this way, parasitic capacitance generated between the second connecting structure and the first connecting structure may be reduced, thereby improving or eliminating an impact of a bridging point of a touch electrode on touch linearity of a touch panel, to ensure better stability of the touch panel in use.

Based on the same concept described above, a touch panel is further provided, including a plurality of first electrode units distributed along a first direction, a plurality of second electrode units distributed along a second direction a first connecting structure and a second connecting structure. Adjacent two of the plurality of first electrode units are connected through the first connecting structure. The first connecting structure includes at least two bridge structures, the two bridge structures each includes two bridging lines, and the two bridge structures intersect with each other to form an overlapping region. Adjacent two second electrode units are connected through the second connecting structure, and the second connecting structure includes a plurality of connecting grids. The connecting grid includes a plurality of subgrids connected to each other, and an area of an orthographic projection of the overlapping region on a plane where the second connecting structure is located is greater than or equal to an area of an orthographic projection of one subgrid on the plane where the second connecting structure is located. In such a design, the first connecting structure for connecting adjacent two of the plurality of first electrode units and the second connecting structure for connecting adjacent two second electrode units are improved, so that an area of an intersection between the first connecting structure and the second connecting structure can be reduced, thereby reducing parasitic capacitance between the first connecting structure and the second connecting structure, and further improving or eliminating an impact of a bridging point of a touch electrode on touch linearity of a touch panel, to ensure better stability of the touch panel in use.

In the embodiment, a preparation material of the first electrode unit 1, the second electrode unit 2, the first connecting structure 3, the second connecting structure 4, and the reinforcing structure 6 may be indium tin oxide (Indium tin oxide, ITO), metal mesh (metal mesh), a silver nano wire (silver nano wire), carbon nano tube (carbon nano tube, CNT), polymer conductive layer, or the like, which is not limited herein. For example, a process for preparing the first electrode unit 1, the second electrode unit 2, the first connecting structure 3, the second connecting structure 4, and the reinforcing structure 6 on a substrate may be a photolithography (photolithography) process, a screen printing (screen printing) process, or another process, which is not limited herein.

In this embodiment, a touch panel 100 may further include a signal line electrically connected to the first electrode unit 1 and the second electrode unit 2, the signal line is electrically connected to a related circuit (such as a driving circuit, or a touch monitoring circuit) in the touch panel 100, and the signal line may transmit a signal (such as a touch signal) transmitted by the first electrode unit 1 and the second electrode unit 2 to the related circuit, so as to calculate a touch position on the touch panel 100 based on the touch signal.

It may be understood that, the corresponding touch panel 100 in the foregoing embodiment may be applied to a single-layer touch design or a double-layer touch design, which is not limited herein. When the foregoing touch panel 100 is applied to the single-layer touch design, the first electrode units 1, the second electrode units 2, and the second connecting structure 4 are designed in a same layer, the first connecting structure 3 is bridged between the first electrode units 1, and the layer where the first electrode units 1, the second electrode units 2, and the second connecting structure 4 are located is different from a layer where the first connecting structure 3 is located. An insulating layer is disposed between the layer where the first connecting structure 3 is located and the layer where the second connecting structure 4 is located. When the touch panel 100 is applied to the double-layer touch design, one layer may include the first electrode units 1 and the first connecting structure 3, and the other layer may include the second electrode units 2 and the second connecting structure 4. An insulating layer is disposed between the layer where the first electrode units 1 and the first connecting structure 3 are located and the layer where the second electrode units 2 and the second connecting structure 4 are located.

In conclusion, the embodiment of the present application provides a touch panel 100 and a display panel 200. The first connecting structure 3 and the second connecting structure 4 are improved, so that parasitic capacitance between the first connecting structure 3 and the second connecting structure 4 can be reduced to improve touch linearity of the touch panel 100 and the display panel 200, and stress resistance generated when the first connecting structure 3 is bent can also be improved to enhance structural stability of the touch panel 100 and the display panel 200. In this way, based on two levels of touch linearity and structural stability, use stability of the touch panel 100 and display panel 200 is improved to ensure that the touch panel 100 and the display panel 200 can meet use requirements.

The technical features of the foregoing embodiments may be combined arbitrarily. To make the description concise, not all possible combinations of the various technical features in the foregoing embodiments are described. However, as long as there is no contradiction in the combination of these technical features, it should be considered that the scope of the specification is set forth.

The foregoing embodiments describe only several implementations of the present application, and the description is relatively specific and detailed, but should not be understood as a limitation on the application scope. It should be noted that those skilled in the art may further make several variations and improvements without departing from the concept of the present application, and all these variations and improvements fall within the protection scope of the present application. Therefore, the protection scope of the present application shall be subjected to the appended claims.

What is claimed is:

1. A touch panel, comprising:
a plurality of first electrode units distributed along a first direction;
a plurality of second electrode units distributed along a second direction;
a first connecting structure, adjacent two of the plurality of first electrode units being connected through the first connecting structure;
a second connecting structure, adjacent two of the plurality of second electrode units being connected through the second connecting structure, the second connecting structure comprising a plurality of connecting grids and a graphics unit adjacent to the connecting grids; and
an insulating layer disposed between the first connecting structure and the second connecting structure;
wherein an orthographic projection of the first connecting structure on the second connecting structure intersects with the graphics unit to make the graphics unit have a plurality of graphics grids identical to the connecting grids, each of the connecting grids comprises two first sub-grids connected to each other along a third direction and a second sub-grid and a third sub-grid connected to each other along a fourth direction, an area of an orthographic projection of a first sub-grid, of the plurality of first sub-grids, on the insulating layer is less than an area of an orthographic projection of the second sub-grid on the insulating layer, the area of the orthographic projection of the first sub-grid on the insulating layer is less than an area of an orthographic projection of the third sub-grid on the insulating layer, the graphics unit comprises a plurality of graphics subunits, and an area of an orthographic projection of a graphics subunit, of the plurality of graphics subunits, on the insulating layer is greater than or equal to twice the area of the orthographic projection of the first sub-grid on the insulating layer, and the first sub-grid, the second sub-grid, and the third sub-grid share one vertex.

2. The touch panel according to claim 1, wherein the first electrode unit comprises a plurality of first grids formed by a plurality of intersecting first metal wires, the second electrode unit comprises a plurality of second grids, and the plurality of second grids and the plurality of connecting grids are all formed by a plurality of intersecting second metal wires;

the second electrode unit comprises a plurality of graphics grids identical to the connecting grids in the second connecting structure; and
the graphics unit comprises a plurality of third grids formed by the plurality of intersecting second metal wires.

3. The touch panel according to claim 2, wherein the first connecting structure comprises a first bridge structure and a second bridge structure, the first bridge structure and the second bridge structure respectively comprises at least one bridging line, and the first bridge structure and the second bridge structure are separated from each other or connected to each other.

4. The touch panel according to claim 3, wherein the first bridge structure and the second bridge structure are symmetrical to each other along the second direction.

5. The touch panel according to claim 4, wherein the first bridge structure and the second bridge structure are connected to each other, and the first bridge structure and the second bridge structure are in point contact with each other;
the first bridge structure and the second bridge structure respectively comprises two bridging lines, the two bridging lines intersect with each other to form a polygon, and an area of an orthographic projection of the polygon on a plane where the second connecting structure is located is greater than or equal to an area of an orthographic projection of a connecting grid of the plurality of connecting grids on the plane where the second connecting structure is located; and
along the second direction, a vertex of a polygon of the first bridge structure is shared with a vertex of a polygon of the second bridge structure that is opposite to the vertex of the polygon of the first bridge structure.

6. The touch panel according to claim 4, wherein the first bridge structure and the second bridge structure are separated from each other;
the first bridge structure and the second bridge structure respectively comprises two bridging lines, the two bridging lines intersect with each other to form a polygon, and an area of an orthographic projection of the polygon on a plane where the second connecting structure is located is greater than or equal to an area of an orthographic projection of a connecting grid of the plurality of connecting grids on the plane where the second connecting structure is located; and
along the second direction, a vertex of a polygon of the first bridge structure and a vertex of a polygon of the second bridge structure that is opposite to the vertex of the polygon of the first bridge structure having a distance therebetween.

7. The touch panel according to claim 3, where the first bridge structure and the second bridge structure are connected to each other by intersecting each other; and
the first bridge structure and the second bridge structure intersect with each other to form a first overlapping region, and an area of an orthographic projection of the first overlapping region on a plane where the second connecting structure is located is greater than or equal to an area of an orthographic projection of the first sub-grid on the plane where the second connecting structure is located.

8. The touch panel according to claim 7, wherein the first bridge structure and the second bridge structure respectively comprises two bridging lines, the two bridging lines intersect with each other to form a polygon, and an area of an orthographic projection of the polygon on a plane where the second connecting structure is located is greater than or equal to an area of an orthographic projection of a connecting grid of the plurality of connecting grids on the plane where the second connecting structure is located; and along the second direction, a vertex of a polygon of the first bridge structure is located within a polygon formed by the second bridge structure, and a vertex of the polygon of the second bridge structure opposite to the vertex of the polygon of the first bridge structure is located within the polygon formed by the first bridge structure to form the first overlapping region.

9. The touch panel according to claim 7, wherein the first bridge structure and the second bridge structure respectively comprises two bridging lines parallel to each other; and the first connecting structure comprises a second overlapping region formed by the two parallel bridging lines of the first bridge structure intersecting with the two parallel bridging lines of the second bridge structure, and two extension lines connected to vertices of the second overlapping region, respectively.

10. The touch panel according to claim 9, wherein an area of an orthographic projection of the second overlapping region on the plane where the second connecting structure is located is greater than or equal to an area of the orthographic projection of the first sub-grid on the plane where the second connecting structure is located; and the orthographic projection of the second overlapping region on the second connecting structure and the graphics unit overlap, and an orthographic projection of the extension lines on the second connecting structure and the graphics unit intersect.

11. The touch panel according to claim 9, further comprising at least one reinforcing structure, wherein the reinforcing structure comprises two reinforcing metal wires; and ends of the two reinforcing metal wires are connected to each other, the other ends of the two reinforcing metal wires respectively intersect with the two extension lines where one vertex of a polygon is located, and the reinforcing structure forms a reinforcing grid with a vertex of the second overlapping region.

12. The touch panel according to claim 3, wherein the two bridging lines of the first connecting structure are all parallel to the plurality of first metal wires.

13. The touch panel according to claim 8, wherein the polygon formed at the intersection of the two bridging lines is a triangle or a quadrilateral, and a quantity of sides of the first overlapping region is the same as a quantity of sides of the polygon formed at the intersection of the two bridging lines.

14. A display panel, comprising: a pixel unit for emitting light, wherein the pixel unit comprises at least three sub-pixels of different colors and the touch panel of claim 1, located on one side of the pixel unit, and an orthographic projection of at least one pixel unit on the touch panel is located within an outer contour of a connecting grid of the plurality of connecting grids.

15. The display panel according to claim 14, wherein the connecting grid comprises a plurality of adjacently arranged sub-grids, and orthographic projections, on the touch panel, of sub-pixels of the pixel unit with the orthographic projection of the at least one pixel unit on the touch panel located within an inner contour of the connecting grid are located within outer contours of the sub-grids, respectively.

16. The display panel according to claim 15, wherein the pixel unit with the orthographic projection located within the inner contour of the connecting grid comprises two green sub-pixels, one red sub-pixel, and one blue sub-pixel; and the connecting grid comprises two first sub-grids that are connected to each other along a third direction and a second sub-grid and a third sub-grid that are connected to each other along a fourth direction; and orthographic projections of the two green sub-pixels on the touch panel are respectively located within inner contours of the two first sub-grids, an orthographic projection of the red sub-pixel on the touch panel is located within an inner contour of the second sub-grid, and an orthographic projection of the blue sub-pixel on the touch panel is located within an inner contour of the third sub-grid.

17. A touch panel, comprising:

a plurality of second electrode units distributed along a second direction;

a second connecting structure, adjacent two second electrode units being connected through the second connecting structure, wherein the second connecting structure comprises a plurality of connecting grids and a graphics unit adjacent to the connecting grids; and each of the connecting grids comprises two first sub-grids connected to each other along a third direction and a second sub-grid and a third sub-grid connected to each other along a fourth direction, an area of an orthographic projection of a first sub-grid, of the two first sub-grids, on an insulating layer is less than an area of an orthographic projection of the second sub-grid on the insulating layer, the area of the orthographic projection of the first sub-grid on the insulating layer is less than an area of an orthographic projection of the third sub-grid on the insulating layer, the graphics unit comprises a plurality of graphics subunits, and an area of an orthographic projection of a graphics subunit of the plurality of graphics subunits on the insulating layer is greater than or equal to twice the area of the orthographic projection of the first sub-grid on the insulating layer, and the first sub-grid, the second sub-grid, and the third sub-grid share one vertex.

18. A touch panel, comprising:

a plurality of first electrode units distributed along a first direction;

a plurality of second electrode units distributed along a second direction;

a first connecting structure, adjacent two of the plurality of first electrode units being connected through the first connecting structure, the first connecting structure comprising at least two bridge structures, the two bridge structures respectively comprising two bridging lines, and the two bridge structures intersecting with each other to form an overlapping region; and a second connecting structure, adjacent two of the plurality of second electrode units being connected through the second connecting structure, the second connecting structure comprising a plurality of connecting grids, the connecting grids comprising a plurality of sub-grids connected to each other, and an area of an orthographic projection of the overlapping region on a plane where the second connecting structure is located is greater than or equal to an area of an orthographic projection of one sub-grid of the plurality of sub-grids, on the plane where the second connecting structure is located;

wherein each of the connecting grids comprises two first sub-grids connected to each other along a third direction and a second sub-grid and a third sub-grid connected to each other along a fourth direction, an area of an orthographic projection of a first sub-grid, of the two first sub-grids, on an insulating layer is less than an area of an orthographic projection of the second sub-grid on the insulating layer, the area of the orthographic projection of the first sub-grid on the insulating layer is less than an area of an orthographic projection of the third sub-grid on the insulating layer, a graphics unit comprises a plurality of graphics subunits, and an area of an orthographic projection of a graphics subunit, of the plurality of graphics subunits, on the insulating layer is greater than or equal to twice the area of the orthographic projection of the first sub-grid on the insulating layer, and the first sub-grid, the second sub-grid, and the third sub-grid share one vertex.

* * * * *